United States Patent
Matsuo

(10) Patent No.: US 11,450,131 B2
(45) Date of Patent: Sep. 20, 2022

(54) ELECTRONIC DEVICE

(71) Applicant: CANON KABUSHIKI KAISHA, Tokyo (JP)

(72) Inventor: Yasuhiro Matsuo, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/168,749

(22) Filed: Feb. 5, 2021

(65) Prior Publication Data
US 2021/0248361 A1   Aug. 12, 2021

(30) Foreign Application Priority Data
Feb. 7, 2020  (JP) .............................. JP2020-019781

(51) Int. Cl.
*G06T 7/20* (2017.01)
*G06V 40/10* (2022.01)
*G06V 20/00* (2022.01)

(52) U.S. Cl.
CPC ............... *G06V 40/10* (2022.01); *G06T 7/20* (2013.01); *G06V 20/00* (2022.01)

(58) Field of Classification Search
None
See application file for complete search history.

(56) References Cited

U.S. PATENT DOCUMENTS

2021/0331706 A1 * 10/2021 Kim ...................... G06V 40/28

FOREIGN PATENT DOCUMENTS

| JP | 2018-007272 A | | 1/2018 |
| JP | 2018007272 A | * | 1/2018 |
| WO | WO-2018067058 A1 | * | 4/2018 |

* cited by examiner

*Primary Examiner* — Shadan E Haghani
(74) *Attorney, Agent, or Firm* — Cowan, Liebowitz & Latman, P.C.

(57) ABSTRACT

An electronic device according to the present invention includes at least one memory and at least one processor which function as: an acquisition unit configured to acquire line-of-sight information relating to a line of sight of a user; a display control unit configured to execute control to display a captured image on a display surface; a tracking unit configured to detect an object in the image so as to track the object; and a setting unit configured to set a tracking target of the tracking unit, wherein the setting unit resets the tracking target based on the line-of-sight information and a tracking history of an object that is the tracking target in a case where the object stops being detected.

11 Claims, 16 Drawing Sheets

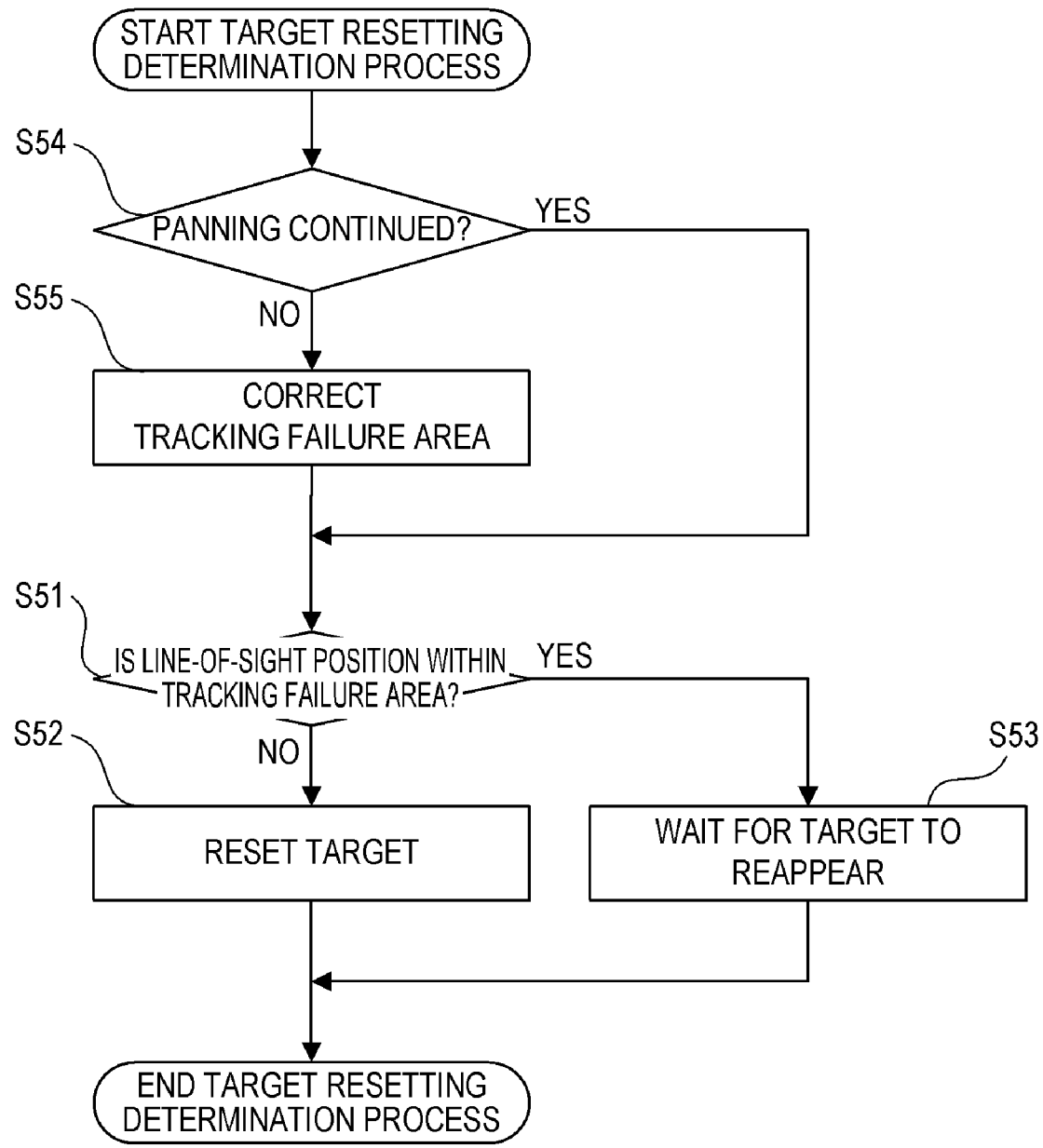

ELECTRONIC DEVICE

BACKGROUND OF THE INVENTION

Field of the Invention

The present invention relates to an electronic device capable of executing tracking of an object within an imaging area.

Description of the Related Art

An imaging apparatus can perform object tracking (tracking of an object within an imaging area) to keep a target (tracking target) in focus. In object tracking, it is sometimes necessary to reset the target when the target has stopped being detected. The target may fail to be detected, for example, when the target is hidden behind another object, or when the target moves out of the screen (image display area where the captured image is displayed). Japanese Patent Application Laid-open No. 2018-7272 discloses a method whereby object tracking is continued without the target being reset when the target is detected within a predetermined area within a threshold time from the time point when the target stopped being detected within the predetermined area. This method enables stable object tracking even when the target temporarily stops being detected.

However, it is difficult to determine a singular threshold time of waiting for the target to be detected again, because there can be various cases where the target may become temporarily undetectable. For this reason, favorable resetting of a target (tracking target) is sometimes not possible with the method disclosed in Japanese Patent Application Laid-open No. 2018-7272.

SUMMARY OF THE INVENTION

The present invention provides a technique that enables favorable resetting of a tracking target.

An electronic device according to the present invention includes at least one memory and at least one processor which function as: an acquisition unit configured to acquire line-of-sight information relating to a line of sight of a user; a display control unit configured to execute control to display a captured image on a display surface; a tracking unit configured to detect an object in the image so as to track the object; and a setting unit configured to set a tracking target of the tracking unit, wherein the setting unit resets the tracking target based on the line-of-sight information and a tracking history of an object that is the tracking target in a case where the object stops being detected.

Further features of the present invention will become apparent from the following description of exemplary embodiments with reference to the attached drawings.

BRIEF DESCRIPTION OF THE DRAWINGS

FIG. 10 is a flowchart illustrating an example of target resetting determination according to the second embodiment;

DESCRIPTION OF THE EMBODIMENTS

Figure 1:
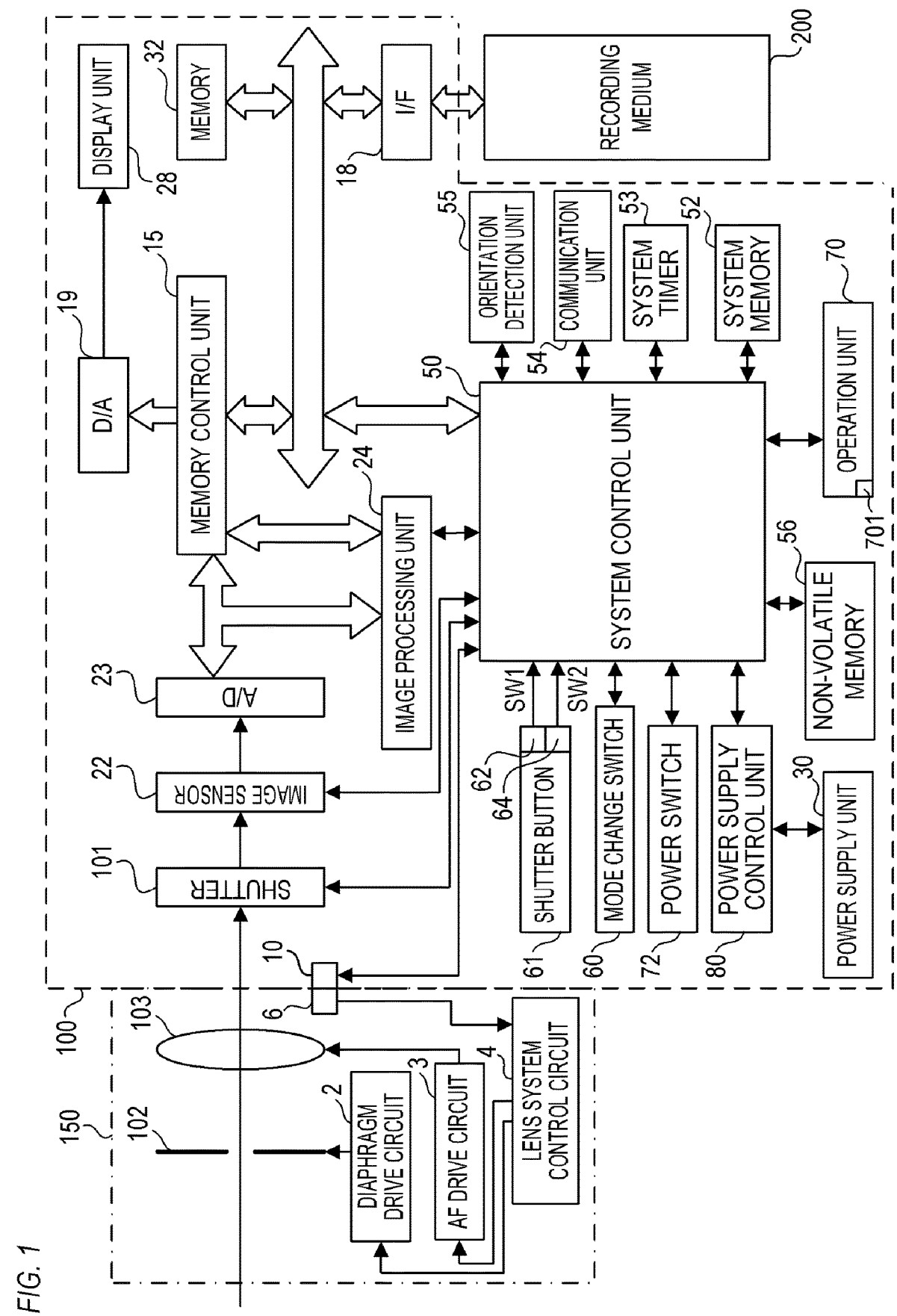
FIG. 1 is a block diagram illustrating a configuration example of an imaging apparatus according to the embodiment.

The present invention will be hereinafter described in detail based on its illustrative embodiments with reference to the accompanying drawings. An object of the present invention is to provide a technique that enables favorable resetting of a tracking target. When, for example, the threshold time for waiting for a target (object) to be detected again in a result of object detection is short, sometimes the target may be switched to another object as a result of being reset, even though the target will be detected again after a while. On the other hand, if the threshold time is long, the target may keep failing to be detected and a good photo opportunity may be missed. The present invention features resetting of a tracking target based on information of the user's line of sight and the tracking history of an object when the target stops being detected. The following embodiments shall not limit the present invention. While a plurality of features are described below, it does not mean that all of them are essential for the present invention. The plurality of features described below may be combined in any way. Same or similar constituent elements in the accompanying drawings are given the same reference numerals to omit repetitive description.

The following embodiments will be described in relation to a case where the present invention is applied to an imaging apparatus (specifically, a lens-changeable digital camera). However, the present invention is applicable to any electronic device to which an object-tracking function (function that executes tracking of an object within an imaging area) can be installed. Such electronic device includes a video camera, computer equipment (personal computer, tablet computer, media player, PDA, etc.), mobile phone, smartphone, game machine, robot, drone, drive recorder, and so on. These are only examples and the present invention can be applied to other electronic devices. While the digital camera described below includes the object-tracking function, a line-of-sight detection function, imaging function, display function, etc., the present invention is also applicable to a configuration that has these functions separately installed on several mutually communicable devices (e.g., a main machine and a remote controller).

[Configuration]

FIG. 1 is a block diagram illustrating a configuration example of a digital camera system as one example of electronic device according to the embodiment of the present invention. The digital camera system includes a main body 100 of a lens-changeable digital camera, and a lens unit 150 removably attached to the main body 100. The lens changeability is not essential for the present invention.

The lens unit 150 includes a communication terminal 6 that makes contact with a communication terminal 10 provided to the main body 100 when attached to the main body 100. Power is supplied from the main body 100 to the lens unit 150 via the communication terminal 10 and communication terminal 6. A lens system control circuit 4 of the lens unit 150 and a system control unit 50 of the main body 100 are mutually communicable via the communication terminal 10 and communication terminal 6.

The lens unit 150 includes a lens assembly 103 that is an imaging optical system composed of a plurality of lenses including a movable lens. The movable lens at least includes a focus lens. Depending on the lens unit 150, one or more of a zoom lens, a blur correction lens, and so on, can further be included. An AF drive circuit 3 includes a motor, an actuator and the like for driving the focus lens. The focus lens is driven by the lens system control circuit 4 controlling the AF drive circuit 3. A diaphragm drive circuit 2 includes a motor actuator and the like for driving a diaphragm 102. The aperture size of the diaphragm 102 is adjusted by the lens system control circuit 4 controlling the diaphragm drive circuit 2.

A mechanical shutter 101 is driven by the system control unit 50 to adjust the exposure time of an image sensor 22. The mechanical shutter 101 is kept fully open when shooting a movie.

The image sensor 22 is a CCD image sensor or a CMOS image sensor, for example. The image sensor 22 includes two-dimensionally arranged multiple pixels, each pixel being provided with one micro lens, one color filter, and one or more opto-electronic conversion units. In this embodiment, each pixel includes a plurality of opto-electronic conversion units and each pixel is configured to be able to output a signal from each of the opto-electronic conversion units. The pixels configured this way enable generation of image signals for captured images, stereoscopic image pairs, and phase-difference AF, from signals read out from the image sensor 22.

Figure 2A:
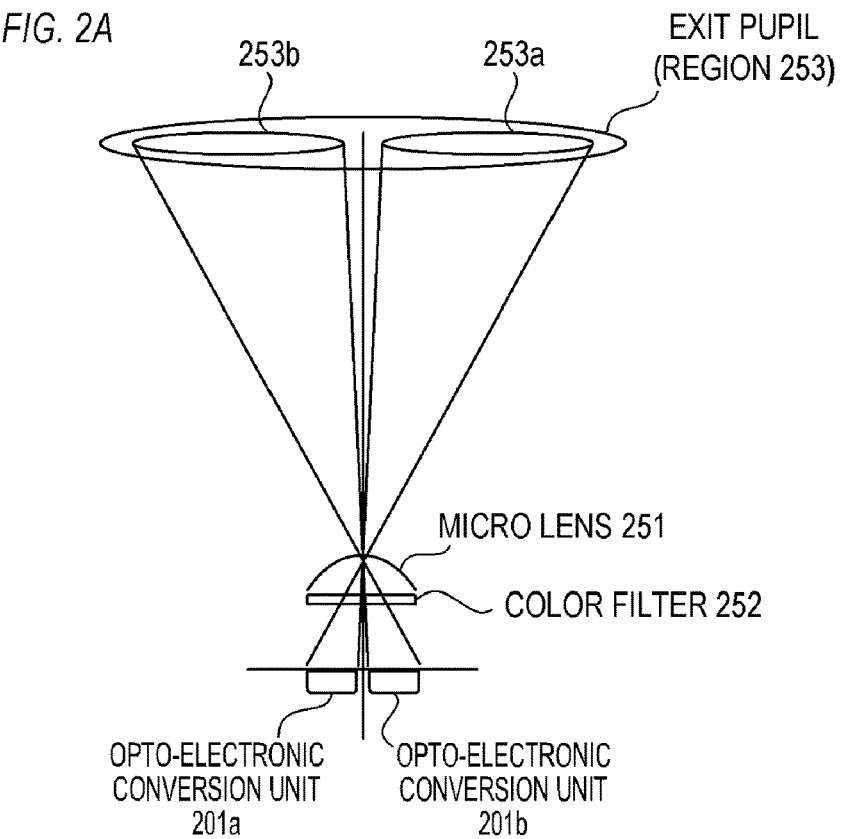
FIG. 2A and FIG. 2B are diagrams illustrating an example of correspondence between an exit pupil and an opto-electronic conversion unit of an imaging apparatus according to the embodiment.

FIG. 2A is a schematic diagram illustrating the correspondence between an exit pupil of the lens unit 150 and each of opto-electronic conversion units when each pixel of the image sensor 22 has two opto-electronic conversion units.

The two opto-electronic conversion units 201a and 201b provided to the pixel share one color filter 252 and one micro lens 251. Light that has passed through a partial region 253a and a partial region 253b of the emission exit (region 253) enters the opto-electronic conversion unit 201a and the opto-electronic conversion unit 201b, respectively.

Therefore, a pair of stereoscopic images are formed by images respectively formed by signals read out from the opto-electronic conversion units 201a and opto-electronic conversion units 201b of the pixels included in a given pixel area. The stereoscopic image pair can be used as image signals (A image signal and B image signal) for phase-difference AF. Further, a normal image signal (captured image) can be obtained by adding signals respectively read out from the opto-electronic conversion units 201a and opto-electronic conversion units 201b of each pixel.

Figure 2B:
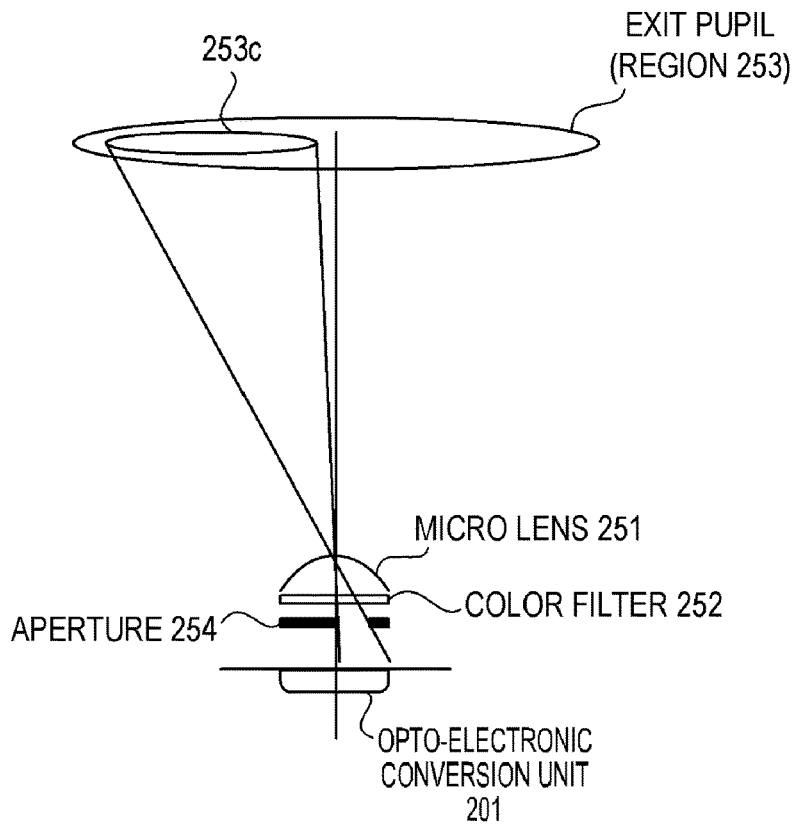

In this embodiment, each pixel of the image sensor 22 functions both as the pixel for generating a signal for phase-difference AF (focus detection pixel) and the pixel for generating a normal image signal (imaging pixel). Optionally, some of the pixels of the image sensor 22 may be configured as the focus detection pixels, and the other pixels may be configured as imaging pixels. FIG. 2B illustrates an example of correspondence between a focus detection pixel and a region 253 of the exit pupil through which the incident light passes. The opto-electronic conversion unit 201 of the focus detection pixel illustrated in FIG. 2B functions similarly to the opto-electronic conversion unit 201b of FIG. 2A with the use of the aperture 254. It is practically possible to set a focus detection area of any size anywhere by distributing the focus detection pixel illustrated in FIG. 2B, and another type of focus detection pixel that functions similarly to the opto-electronic conversion unit 201a of FIG. 2A over the entire image sensor 22.

While the configuration illustrated in FIG. 2A and FIG. 2B is that of an image sensor for obtaining images to be recorded, which is used as the sensor for phase-difference AF, the present invention can be embodied for any other types of AF, such as for autofocusing that allows setting of a focus detection area of any size and location. For example, the present invention is applicable also to a configuration that uses contrast AF. In the case of using only the contrast AF, each pixel has only one opto-electronic conversion unit.

Referring back to FIG. 1, an A/D converter 23 is used for converting an analog image signal output from the image sensor 22 into a digital image signal (image data). The A/D converter 23 may be included in the image sensor 22.

The image data (RAW image data) output by the A/D converter 23 is processed as required at an image processing unit 24, and stored in a memory 32, via a memory control unit 15. The memory 32 is used as a buffer memory for storing image data or audio data temporarily, or as a video memory for a display unit 28.

The image processing unit 24 applies predetermined image processing to the image data to generate a signal or image data, or acquire and/or generate various pieces of information. The image processing unit 24 may be a dedicated hardware circuit such as an ASIC designed to realize specific functions, for example, or a configuration with a processor such as a DSP executing software to realize specific functions.

The image processing the image processing unit 24 applies here includes pre-processing, color interpolation, correction, detection, data processing, evaluation value calculation, and so on. Pre-processing includes signal amplification, reference level adjustment, defect pixel correction, and so on. Color interpolation is a process of interpolating the values of color components not contained in the image data and also called demosaicing. Correction includes white balance adjustment, correction of luminance of the image, correction of optical aberrations of the lens unit 150, color calibration, and so on. Detection includes detection and tracking of a characteristic area (e.g., face area, human body area), identification of a person, and so on. Data processing includes scaling, encoding, decoding, header information generation, and so on. Evaluation value calculation includes calculation of evaluation values of pairs of image signals for phase-difference AF, or for contrast AF, evaluation values used for automatic exposure control, and so on. These are examples of image processing the image processing unit 24 can carry out, and should not be understood as limiting the image processing carried out by the image processing unit 24. The evaluation value calculation may be performed by the system control unit 50.

A D/A converter 19 generates an analog signal suited to display at the display unit 28 from the image data for display stored in the memory 32, and supplies the generated analog signal to the display unit 28. The display unit 28 includes a liquid crystal display apparatus, for example, and executes display on the basis of the analog signal from the D/A converter 19 on a display surface.

Shooting a movie (imaging control) while displaying the footage (display control) continuously allows the display unit 28 to function as an electronic view finder (EVF). The movie displayed to cause the display unit 28 to function as an EVF is called a live view image. The display unit 28 may be provided inside the main body 100 to be viewed through an eyepiece, or may be provided on a housing surface of the main body 100 to be viewable without an eyepiece. The display unit 28 may be provided to both of inside the main body 100 and on the housing surface.

The system control unit 50 is a CPU (also called MPU or microprocessor), for example. The system control unit 50 controls the operations of the main body 100 and the lens unit 150 by reading a program stored in a non-volatile memory 56 into a system memory 52 and executing the program to realize the functions of the camera system. The system control unit 50 sends various commands to the lens system control circuit 4 via communication through the communication terminals 10 and 6 to control the operation of the lens unit 150.

The non-volatile memory 56 stores the program executed by the system control unit 50, various setting values of the camera system, image data of a GUI (Graphical User Interface), and so on. The system memory 52 is a main memory the system control unit 50 uses when executing a program. The data (information) stored in the non-volatile memory 56 may be re-writable.

The system control unit 50, as one of the operations it performs, carries out an automatic exposure control (AE) process based on an evaluation value generated by the image processing unit 24 or itself to determine a shooting condition. The shooting conditions for capturing a still image are the shutter speed, aperture value, and sensitivity, for example. The system control unit 50 determines one or more of the shutter speed, aperture value, and sensitivity in accordance with an AE mode that has been set. The system control unit 50 controls the aperture value (aperture size) of the diaphragm mechanism in the lens unit 150. The system control unit 50 also controls the operation of the mechanical shutter 101.

The system control unit 50 drives the focus lens of the lens unit 150 on the basis of an evaluation value or an amount of defocus generated by the image processing unit 24 or itself, to perform autofocus detection (AF) causing the lens assembly 103 to focus on an object within a focus detection area.

A system timer 53 is a built-in clock and used by the system control unit 50.

An operation unit 70 includes a plurality of input devices (button, switch, dial, and so on) the user can operate. Some of the input devices of the operation unit 70 have a name corresponding to the assigned function. While a shutter button 61, a mode change switch 60, a power switch 72 are illustrated separately from the operation unit 70 for convenience, these are included in the operation unit 70. When the display unit 28 is a touch display including a touchscreen, the touchscreen is also included in the operation unit 70. Operations of the input devices included in the operation unit 70 are monitored by the system control unit 50. When the system control unit 50 detects an operation of an input device, the system control unit 50 executes processing in accordance with the detected operation.

The shutter button 61 includes a first shutter switch 62 that turns on and outputs a signal SW1 when half-pressed, and a second shutter switch 64 that turns on and outputs a signal SW2 when fully pressed. When the system control unit 50 detects the signal SW1 (first shutter switch 62 ON), the system control unit executes a preparatory operation for shooting a still image. The preparatory operation includes the AE process and AF process. When the system control unit 50 detects the signal SW2 (second shutter switch 64 ON), the system control unit executes shooting of a still image (imaging and recording operations) in accordance with the shooting condition determined by the AE process.

The operation unit 70 of this embodiment includes a line-of-sight detection unit 701 that detects the line of sight (direction of line of sight) of a user and outputs the detection results (line-of-sight information regarding the user's line of sight). The system control unit 50 can execute various control processes in accordance with the line-of-sight information provided by the line-of-sight detection unit 701. Although the line-of-sight detection unit 701 is not a component directly operated by the user, it is included in the operation unit 70 because the line of sight detected by the line-of-sight detection unit 701 is dealt with as an input.

Figure 3A:
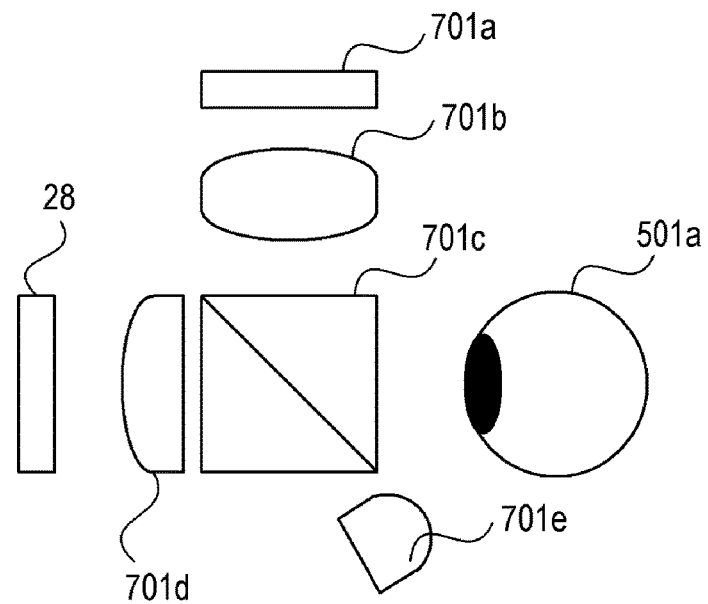
FIG. 3A and FIG. 3B are diagrams illustrating a configuration example of a line-of-sight detection unit according to the embodiment.

FIG. 3A is a schematic side view illustrating a configuration example of the line-of-sight detection unit 701 inside a finder. The line-of-sight detection unit 701 detects the rotation angle of the optical axis of the eyeball 501*a* of a user who is looking at the display unit 28 provided inside the main body 100 through the eyepiece of the finder. The line-of-sight detection unit is able to locate the position in the display unit 28 the user is gazing at (point of gaze in the displayed image) based on the detected direction of line of sight.

The display unit 28 displays a live view image, for example, and the user peering in through the window of the eyepiece can observe the displayed contents of the display unit 28 through an eye lens 701*d* and a dichroic mirror 701*c*. A light source 701*e* can emit infrared light toward the direction of the eyepiece window (toward outside of the main body 100). When the user is peering into the finder, the infrared light emitted by the light source 701*e* is reflected by the eyeball 501*a* and returns into the finder. The infrared light incident in the finder is reflected toward a light-receiving lens 701*b* by the dichroic mirror 701*c*.

The light-receiving lens 701*b* forms an infrared image of the eyeball on the imaging plane of an image sensor 701*a*. The image sensor 701*a* is a two-dimensional imaging device having a filter for the infrared imaging. The image sensor 701*a* for the line-of-sight detection may have a fewer number of pixels than that of the image sensor 22 for shooting. The eyeball image captured by the image sensor 701*a* is sent to the system control unit 50. The system control unit 50 locates the positions of the retinal reflection of infrared light and the pupil in the eyeball image and detects the line-of-sight direction from the positional relationship between them. The system control unit 50 locates the position in the display unit 28 the user is gazing at (point of gaze in the displayed image) based on the detected line-of-sight direction. Alternatively, the positions of the retinal reflection and the pupil in the eyeball image may be located by the image processing unit 24, and the system control unit 50 may obtain their locations from the image processing unit 24.

Figure 3B:
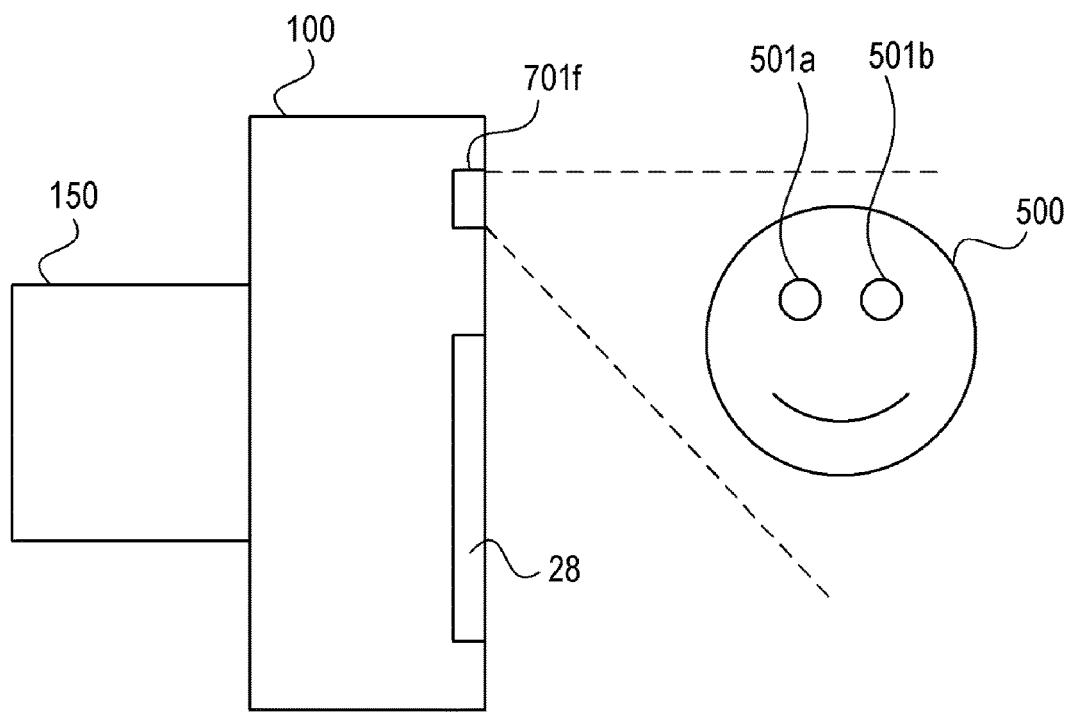

The present invention does not depend on the method of detecting the line of sight or the configuration of the line-of-sight detection unit. The configuration of the line-of-sight detection unit 701 is not limited to the one illustrated in FIG. 3A. For example, as illustrated in FIG. 3B, the line of sight may be detected based on an image captured by a camera 701f disposed near the display unit 28 on the back side of the main body 100. The angle of view of the camera 701f indicated with broken lines is determined such that the face of a user shooting while looking at the display unit 28 is captured. The line-of-sight direction can be detected based on an image of an eye area (area including at least one of the eyeball 501a and the eyeball 501b) that is located in an image captured by the camera 701f In the case of using infrared image sensory, a light source 701e may be disposed near the camera 701f to capture the image of an object inside the angle of view while projecting infrared light. In this case, the method of detecting the line-of-sight direction from the obtained image may be similar to that of FIG. 3A. In the case of using visible light image sensory, no light need to be projected. When using visible light images, the line-of-sight direction can be detected from the positional relationship between the inner corner of the eye and the iris in the eye area.

Referring back to FIG. 1, a power supply control unit 80 is composed of a battery detection circuit, a DC-DC converter, a switch circuit that switches the blocks to be powered, and so on, and detects the presence or absence of a battery being mounted, the type of battery, and remaining battery charge. The power supply control unit 80 controls the DC-DC converter on the basis of the detection results and instructions from the system control unit 50, and supplies a necessary voltage to various units including a recording medium 200 for a necessary period of time.

A power supply unit 30 includes a battery, an AC adapter, and so on. An I/F 18 is an interface for the recording medium 200 such as a memory card, a hard disk, and so on. Data files such as captured images and audio are recorded in the recording medium 200. The data files recorded in the recording medium 200 are read out through the I/F 18, and can be played back via the image processing unit 24 and the system control unit 50.

A communication unit 54 realizes communication with an external device by at least one of wireless communication and wired communication. Images captured by the image sensor 22 (captured images, including live view images), and images recorded in the recording medium 200 can be sent to the external device via the communication unit 54. Image data and various other pieces of information can be received from an external device via the communication unit 54.

An orientation detection unit 55 detects the orientation of the main body 100 relative to the direction of gravity. The orientation detection unit 55 may be an angular velocity sensor, or an angular velocity sensor. The system control unit 50 can record orientation information in accordance with the orientation detected by the orientation detection unit 55 during shooting in the data file in which the image data obtained by the shooting is stored. The orientation information can be used, for example, for displaying the recorded image in the same orientation as when it was captured.

The main body 100 of this embodiment can carry out various control processes to make a characteristic area detected by the image processing unit 24 an appropriate image. For example, the main body 100 can carry out autofocus detection (AF) for causing the characteristic area to come into focus, and automatic exposure control (AE) for giving a correct exposure to the characteristic area. The main body 100 can also carry out automatic white balance for setting a correct white balance for the characteristic area, and automatic flash adjustment for regulating the amount of light to achieve a correct brightness for the characteristic area. Control processes to correctly display the characteristic area are not limited to these. The image processing unit 24 applies a known method to a live view image, for example, detects areas determined to comply with the definition of a predetermined characteristic as characteristic areas, and outputs information such as the position, size, and credibility of each characteristic area to the system control unit 50. The present invention does not depend on the type of the characteristic area or the method of detecting the characteristic area. Since a known method can be used to detect characteristic areas, the description of the method of detecting characteristic areas is omitted.

Feature areas can also be used for detecting object information. When the characteristic area is a face area, for example, whether the red-eye effect is appearing, whether the eyes are closed, or expressions (e.g., smile) are detected as object information. The object information is not limited to these.

This embodiment allows for selection of one characteristic area (main object area) that is to be used for various control processes or for obtaining object information, using the line of sight of the user, from a plurality of characteristic areas that are for example multiple image areas of varying sizes and positions. Hereinafter, the user's act of directing the gaze so as to be detected by the line-of-sight detection unit 701 will be referred to as a line-of-sight input.

[Characteristics of Line-of-Sight Input]

An input of line of sight has the following two characteristics as opposed to an input by operation of a switch or button. First, the input timing cannot be specified as instructed by the user. The time when an operation of a button is detected, for example, can be regarded as the timing of an inputting operation as instructed by the user. The line-of-sight direction, however, is continuously detected and changing, so that it is not possible to determine the line-of-sight direction of which time point is the line-of-sight direction intended by the user to be an instruction.

The second characteristic is the instability of the line-of-sight direction because of the line-of-sight input being based on a living body. Even though the user intends to be gazing at a certain point, the eyeballs may move slightly, or the user may shift the gaze unintentionally. Therefore, to locate the point of gaze in the image, it is necessary to statistically process the line-of-sight direction detected over a certain period of time.

[Issues in Tracking Process]

The tracking process is a process of detecting an object that is set to be the target from an image captured by the image sensor 22 (captured image). In this embodiment, the image processing unit 24 can track a preset target (tracking target), and keep the target in focus by detecting the focal point using the signal of the target area. If, however, the target is hidden behind another object, or the target moves out of the image display area, tracking is interrupted, in which case it is necessary to keep waiting for the target to reappear, or to reset the target. The image display area is an area where the captured image is displayed, and it is one of the entire area of the display surface of the display unit 28, the entire area of a screen (such as a window) presented in the display unit 28, and some area of the display surface or the screen.

Japanese Patent Application Laid-open No. 2018-7272 discloses a method whereby object tracking is continued without the target being reset when the target is detected within a predetermined area within a threshold time from the time point when the target stopped being detected within the predetermined area. However, it is difficult to determine a singular threshold time, because of which favorable resetting of the target is sometimes not possible.

Inputting a line of sight when the target has stopped being detected is another possible method of resetting the target. However, it is difficult to reset the target as intended by the user by using an input of a line of sight only, because of the issues of the inability to input a user instruction at a specific timing and of the instability of the line-of-sight direction.

First Embodiment

Hereinafter, a first embodiment of the present invention will be described. To solve the issues in the tracking process described above, in the first embodiment, the timing of resetting the target, when the target has stopped being detected, is controlled on the basis of an input of a line of sight (line-of-sight information) and the tracking result (tracking history) of the target.

In the first embodiment, the image processing unit 24 is able to reset the target. For example, if a person or an animal that is a desirable object as a target is detected in the captured image after the target has stopped being detected, the image processing unit 24 automatically resets the detected object as the target.

In the first embodiment, the target is reset at a timing that is determined based on an input of a line of sight and a tracking result, instead of after a predetermined time has passed since the target stopped being detected. For example, if the gaze stays at the position where the target has been lost (where the target stopped being detected), it is determined that the user wishes the target to reappear, and the target is waited for to reappear (to be detected again) rather than the target-resetting being activated. On the other hand, if the gaze is shifted away from the position where the target was lost, it is determined that the user has given up tracking the lost target and wishes to track another object, and the target-resetting is activated without the target being waited for to reappear.

By controlling whether or not to execute the resetting of the target based on the past tracking result and the user input of the line of sight this way, a control that more closely fits the user's intention than the method that uses only an input of a line of sight is possible.

Figure 4A:
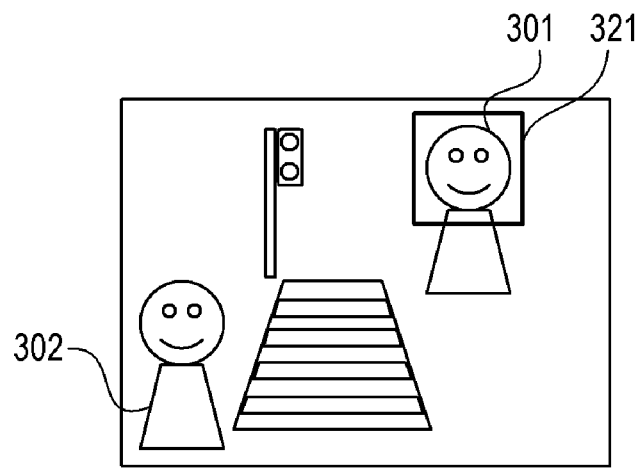
FIG. 4A to FIG. 4C are diagrams illustrating one example of the problem solved by the first embodiment.
Figure 4B:
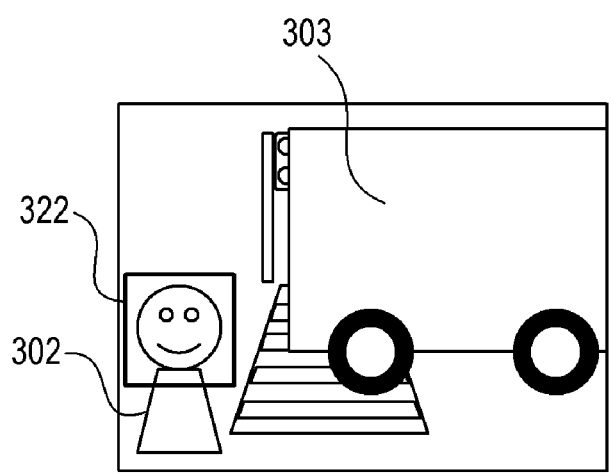
Figure 4C:
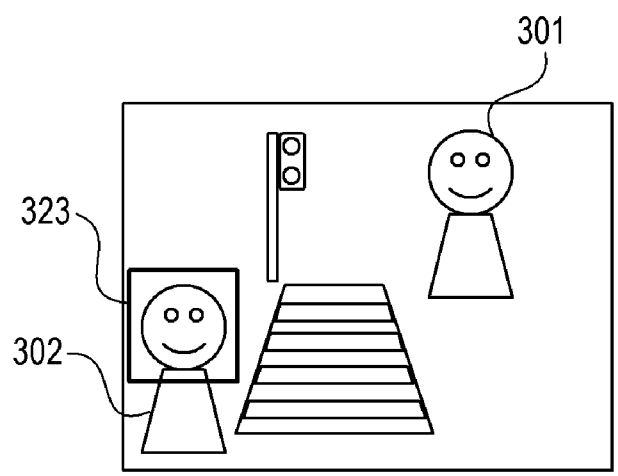

FIG. 4A to FIG. 4C illustrate a specific example of an operation in which, when the target has stopped being detected, the target is reset after a predetermined time has passed irrespective of the user's intention. FIG. 4A to FIG. 4C illustrate the screens shown on the display unit 28. The screen changes as time passes from that of FIG. 4A to that of FIG. 4B, and from that of FIG. 4B to that of FIG. 4C.

A person 301 and a person 302 are present in the captured image displayed on the screen of FIG. 4A. The person 301 is set as the target, and a tracking frame 321 is displayed around the person 301.

In FIG. 4B, the person 301 is hidden behind a car 303 driving past the person 301 so that the person 301 is not detected. Suppose the person 301 is hidden behind the car 303 for more than a predetermined time. The resetting of the target is therefore activated and the person 302 is reset as the target, so that the tracking frame 322 is displayed around the person 302 in FIG. 4B.

In FIG. 4C, while the person 301 has reappeared, the tracking frame 323 is displayed around the person 302, since the person 302 has already been set as the target.

In this way, automatic activation of the resetting of the target after a predetermined time has passed causes switching of the target to the person 302, even if the user wishes to keep tracking the person 301.

Figure 5:
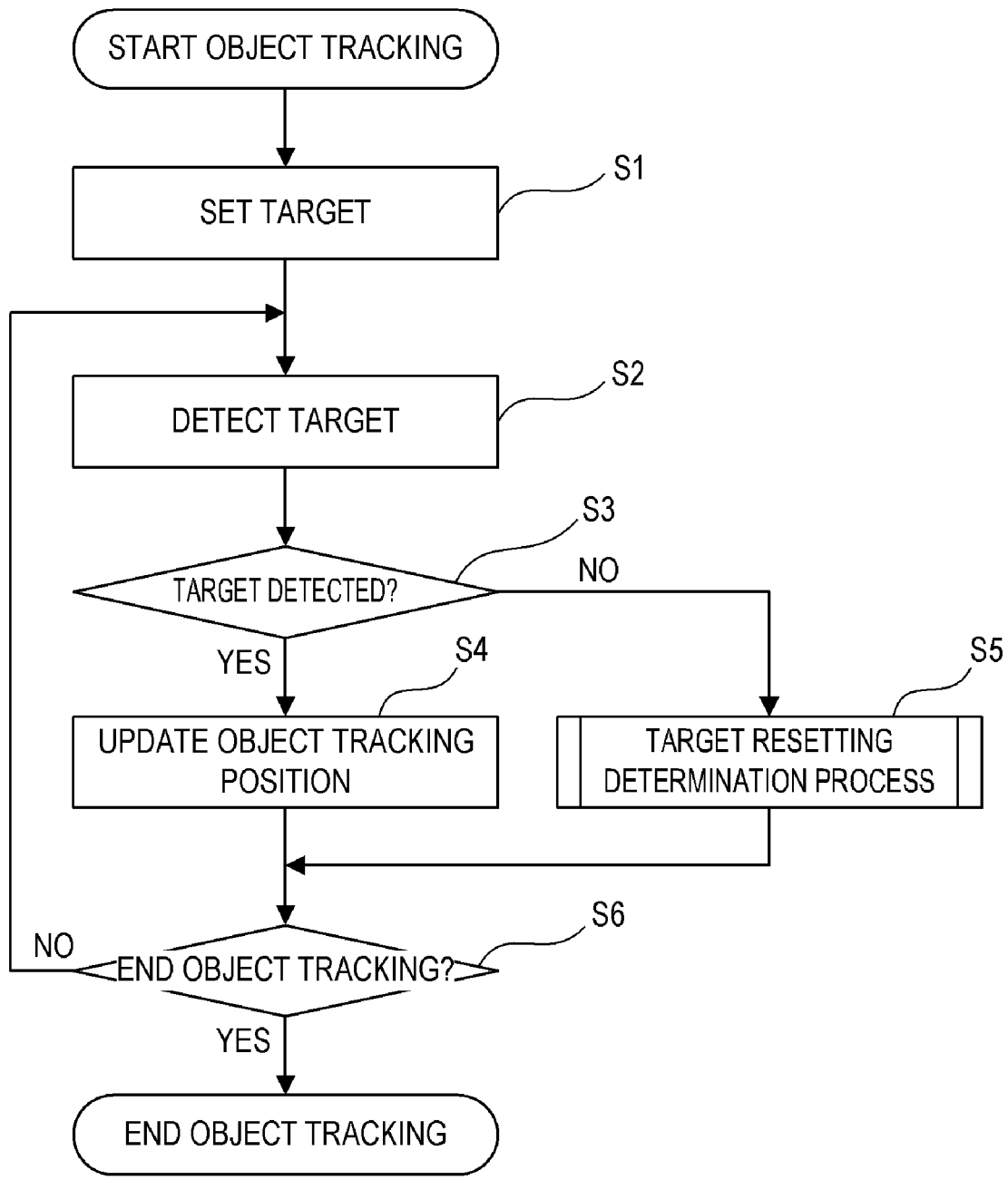
FIG. 5 is a flowchart illustrating an example of object tracking according to the first embodiment.

In the first embodiment, therefore, the control is carried out as shown in the flowchart of FIG. 5. FIG. 5 is a flowchart illustrating an example of object tracking according to the first embodiment. The object tracking illustrated in FIG. 5 is started at the same time as the detection of the signal SW1 (first shutter switch 62 ON) and continued during the period in which the signal SW1 is being detected. The control is not limited to this method. For example, the object tracking may be started at the same time as the setting of a target, and continued during the period in which live view images are shown in the display unit 28.

At step S1, the system control unit 50 sets a target, using the image processing unit 24 or the like. For example, a starting area for the object tracking to be started is displayed in the display unit 28, and an object present within the starting area is set as the target at the timing at which the signal SW1 is detected. The control is not limited to this method. The user may select a target using a touchscreen provided in the display unit 28, or the line-of-sight detection unit 701. Alternatively, the image processing unit 24 may automatically set a detected object such as a person or an animal as the target. The system control unit 50 sets the position of the target as the tracking position, and displays a tracking frame surrounding the target in the display unit 28 on the basis of the tracking position.

At step S2, the system control unit 50 detects the set target from the current frame (captured image), using the image processing unit 24 or the like. For example, the system control unit 50 detects the position of the target that was detected in the frame immediately before the current frame in the current frame using colors, characteristic points, motion vectors, and so on. During the tracking of the object, the processing steps S2 to S6 are repeated. At step S2 for the first time, the current frame is the next one of the frame in which the target was set at step S1.

At step S3, the system control unit 50 determines whether or not a target has been detected at step S2. The system control unit 50 advances the process to step S4 if it determines that the target has been detected, and advances the process to step S5 if it determines that the target has not been detected.

At step S4, the system control unit 50 updates the tracking position to a position where the target was detected at step S2, and updates the display of the tracking frame in the display unit 28. The template for the tracking (detection of the target) such as colors, characteristic points, motion vectors, and so on may be updated at this time.

At step S5, the system control unit 50 performs a target resetting determination process, which is to be described later.

At step S6, the system control unit 50 determines whether or not object tracking is to be ended. The system control unit 50 ends the object tracking (this process flow) if it determines that the object tracking is to be ended, and returns the process to step S2 if it determines that the object tracking is not to be ended (the object tracking is to be continued). Here, the system control unit determines that the object tracking is to be ended when the signal SW1 has stopped being detected. In the case where the object tracking is to be continued during the period in which live view images are shown in the display unit 28, an instruction to end the object tracking may be given by a tracking end button provided to the operation unit 70.

Figure 6:
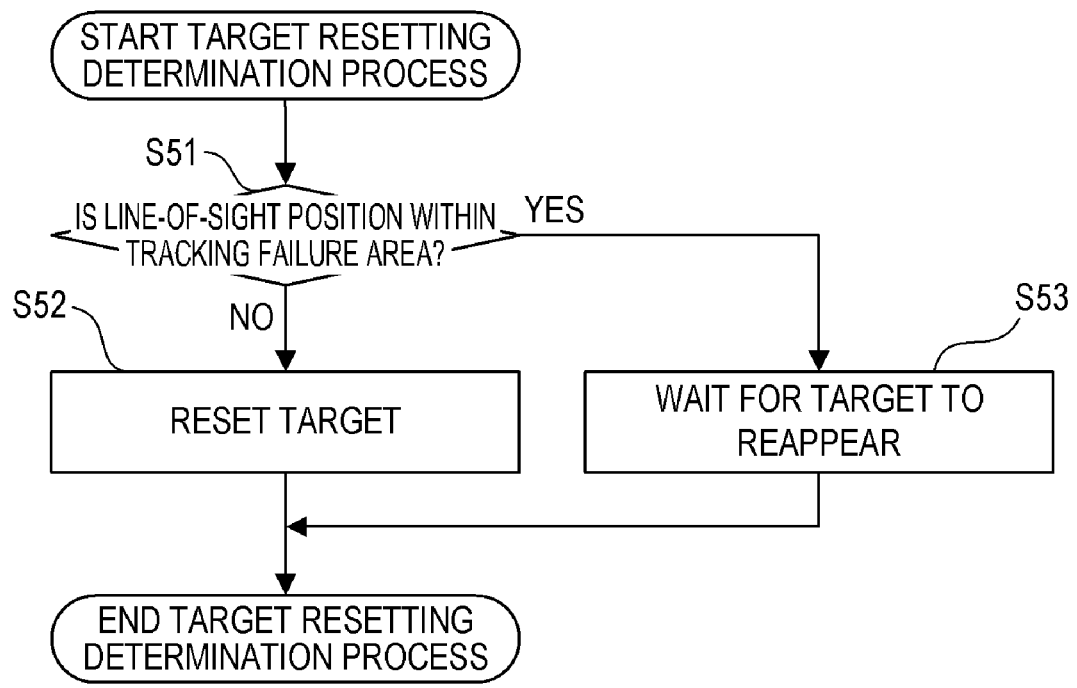
FIG. 6 is a flowchart illustrating an example of target resetting determination according to the first embodiment.

FIG. 6 is a flowchart of the target resetting determination process (step S5). In the target resetting determination process, the timing at which the target is reset is controlled on the basis of an input of a line of sight (line-of-sight information) and the tracking result (tracking history). Hereinafter, the area where the target stopped being detected in the display surface of the display unit 28 (image display area) will be referred to as tracking failure area. The tracking failure area may be regarded as a determination area for determining whether or not the target is to be reset. The tracking failure area may be defined using an area of the target that was detected immediately before the target became undetectable. For example, the area of the target that was detected immediately before the target became undetectable may entirely be defined as the tracking failure area, or, an area where the target was not detected even after performing template matching may be defined as the tracking failure area. Alternatively, an area of the target may be predicted from the past tracking results, and the tracking failure area may be defined using the predicted area in the frame in which the target became undetectable. The target area prediction may be carried on, and the tracking failure area may be changed in accordance with the change of the predicted area.

At step S51, the system control unit 50 determines whether or not a line of sight (line-of-sight direction) detected by the line-of-sight detection unit 701 is directed toward the tracking failure area. In other words, the system control unit 50 determines whether or not the line-of-sight position on the display surface of the display unit 28 is located within the tracking failure area. The system control unit 50 advances the process to step S53 if it determines that the line of sight is directed toward the tracking failure area, and advances the process to step S52 if it determines that the line of sight is not directed toward the tracking failure area (that the line of sight has been shifted away from the tracking failure area).

At step S53, the system control unit 50 waits for the target to reappear (to be detected again), rather than resets the target. Specifically, the system control unit 50 ends the target resetting determination process (step S5), rather than resets the target. While the system control unit here keeps waiting for the target to reappear rather than resets the target if the line of sight is directed toward the tracking failure area, this may not be necessarily so. For example, the system may stop waiting for the target to reappear and reset the target when the waiting time for the reappearance of the target has reached a threshold (waiting time upper limit), rather than depending on the line of sight.

At step S52, the system control unit 50 resets the target. In resetting the target, for example, a person or an animal that is desirable as a target is detected, and the detected object is reset as the target. In the case where a plurality of objects (target candidates) are detected, one of the plurality of detected objects that is closest to the current target may be reset as the target. For example, in resetting the target during the tracking of an object that is an animal, if an animal and a person are detected as target candidates, the animal may be preferentially selected and reset as the target. If no target candidates are detected, the object tracking may be ended, and the object tracking may be restarted from step S1 of FIG. 5.

According to the target resetting determination process shown in FIG. 6, the target is not reset as long as the user keeps gazing at the tracking failure area, and the target is waited for to reappear. Therefore, unintended resetting (unintended switching) of the target is inhibited so that target resetting can be performed more favorably.

Figure 7A:
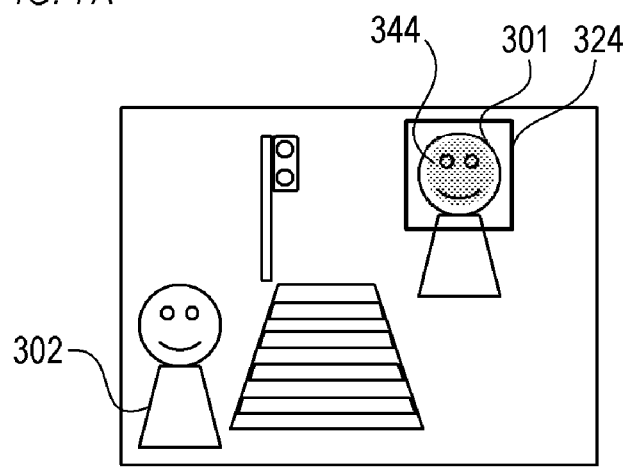
FIG. 7A to FIG. 7C are diagrams illustrating an operation example of target resetting determination according to the first embodiment.
Figure 7B:
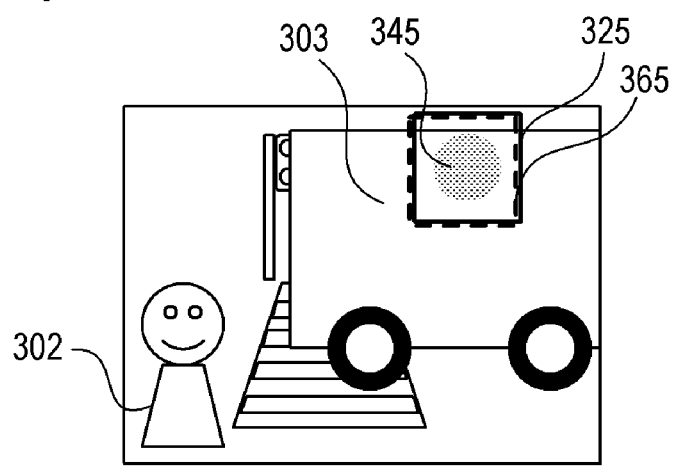
Figure 7C:
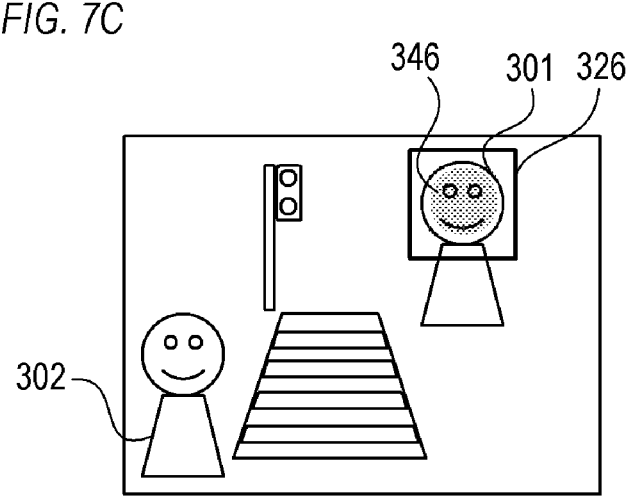
Figure 8A:
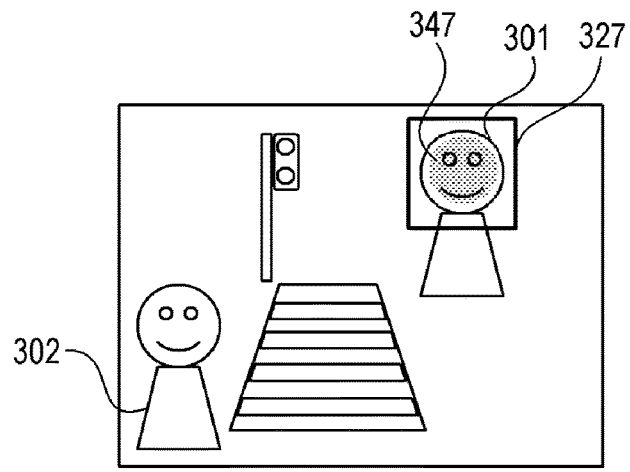
FIG. 8A to FIG. 8C are diagrams illustrating an operation example of target resetting determination according to the first embodiment.
Figure 8B:
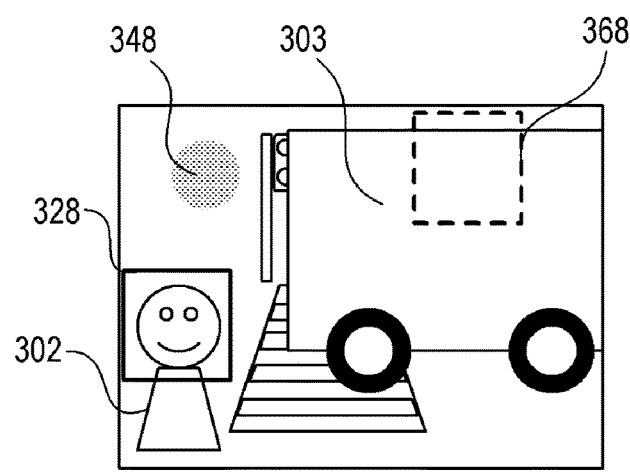
Figure 8C:
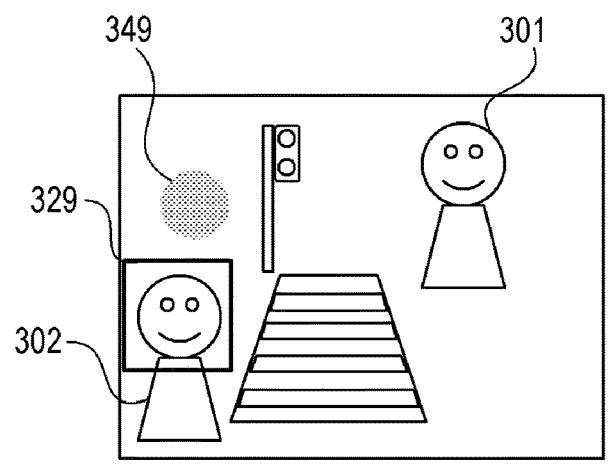

FIG. 7A to FIG. 7C and FIG. 8A to FIG. 8C are diagrams illustrating specific examples of operation in the target resetting determination process shown in FIG. 6. FIG. 7A to FIG. 7C illustrate an example where the user keeps gazing at the tracking failure area, and FIG. 8A to FIG. 8C illustrate an example where the user shifts the gaze away from the tracking failure area. Both of FIG. 7A to FIG. 7C and FIG. 8A to FIG. 8C show a scene where, similarly to FIG. 4A and FIG. 4C, persons 301 and 302 are present, and a car 303 drives past the person 301.

In FIG. 7A, the person 301 is set as the target, and a tracking frame 324 is displayed around the person 301. In FIG. 7A, the line-of-sight position 344 is matching the person 301. In FIG. 7B, the person 301 is hidden behind a car 303 driving past the person 301 so that the person 301 is not detected. At this time, a tracking failure area 365 indicated with broken lines is displayed. In FIG. 7B, the line-of-sight position 345 is present within the tracking failure area 365.

In such a case, the system control unit 50 determines at step S51 that the line of sight is directed toward the tracking failure area, and waits for the target to reappear at step S53. At this time, the tracking frame 325 is not updated and kept displayed at the same position as the tracking frame 324. During the time in which the target is waited for to reappear, the tracking frame may be hidden, and only the tracking failure area may be displayed.

In FIG. 7C, the car 303 has moved out of the display surface of the display unit 28 (image display area) and the person 301 that is the target has reappeared. Since the person 301 set as the target is detected again and the tracking of the person 301 is restarted, the tracking frame 326 is displayed again around the person 301. While the line-of-sight position 346 is present within the tracking frame 326 in FIG. 7C, even if the line-of-sight position 346 were shifted out of the tracking frame 326, the person 301 would still remain the target. Once a target has been set, the object tracking of the set target is carried out irrespective of the line-of-sight position.

In FIG. 8A, similarly to FIG. 7A, the person 301 is set as the target, and a tracking frame 327 is displayed around the person 301. In FIG. 8A, the line-of-sight position 347 is matching the person 301. In FIG. 8B, the person 301 is hidden behind a car 303 driving past the person 301 so that the person 301 is not detected. At this time, a tracking failure area 368 indicated with broken lines is displayed. In FIG. 8B, the line-of-sight position 348 has gone out of the tracking failure area 368.

In such a case, the system control unit 50 determines at step S5 that the line of sight is not directed toward the tracking failure area (that the gaze has been shifted away from the tracking failure area), and resets the target at step S52. In FIG. 8B, the person 302 is visible, and likely to be reset as the target due to the preferential selection of a person, for example, so that a tracking frame 328 is displayed around the person 302.

In FIG. 8C, the person 301 that was originally set as the target has reappeared, but since the person 302 has already been reset as the target, the person 301 is not reset as the target. Even if the line-of-sight position 349 matched the person 301, the person 301 would not be reset as the target. In FIG. 8C, since the person 302 is set as the target, the tracking frame 329 is displayed around the target person 302.

Second Embodiment

Hereinafter, a second embodiment of the present invention will be described. In the second embodiment, when the imaging direction is changed due to a panning operation or the like during the period when the target is being waited for to reappear, the position of the tracking failure area is changed in accordance with the change in the imaging direction.

Figure 9:
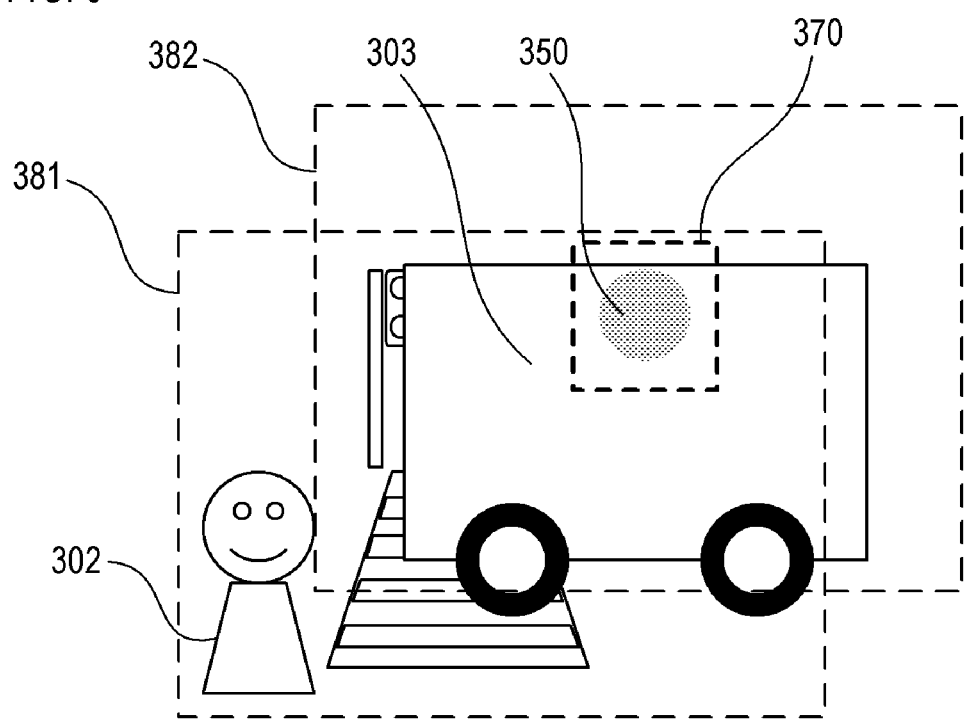
FIG. 9 is a diagram relating to target resetting determination according to a second embodiment.

FIG. 9 illustrates an example of the influence of a change in the imaging direction during the period when the target is being waited for to reappear. In FIG. 9, similarly to FIG. 7B, a person 301 that is not shown is hidden behind a car 303. The user at this time wishes to keep tracking the person 301, so that the line-of-sight position 350 is present within the tracking failure area 370. Here, it is supposed that the tracking failure area 370 was set in a view area (imaging area) 381 indicated by broken lines, after which the view area was changed from the view area 381 to another view area 382 due to a panning operation.

In such a case, even though the user is looking at the same object position, the line-of-sight position (horizontal or vertical position) on the display surface of the display unit 28 will change. In FIG. 9, while the tracking failure area 370 and line-of-sight position 350 are present in the upper right of the display surface (image display area) in the view area 381, the tracking failure area 370 and line-of-sight position 350 are present in the center of the display surface in the view area 382. To allow such an operation, it is desirable to change the position of the tracking failure area in accordance with the amount of change in the imaging direction when the imaging direction is changed during the period when the target is being waited for to reappear.

FIG. 10 is a flowchart of the target resetting determination process (step S5 of FIG. 5) according to the second embodiment.

At step S54, the system control unit 50 determines whether or not a panning operation is continued from before the tracked target was lost based on the amount of panning operation until the tracked target was lost (the target became undetectable) and the amount of panning operation after the tracked target was lost. The system control unit 50 advances the process to step S51 if it determines that the panning operation is continued from before the tracked target was lost, and advances the process to step S55 if not. The latter case is when the panning operation was started after the tracked target was lost, rather than being continued from before the tracked target was lost. The amount of panning operation (amount of change in the imaging direction) is calculated on the basis of an orientation detection signal acquired from the orientation detection unit 55, for example. Alternatively, the amount of panning operation may be estimated from an image between frames, using the image processing unit 24.

At step S55, the system control unit 50 corrects (changes) the position of the tracking failure area in accordance with the amount of panning operation after the tracked target was lost. For example, the position of the tracking failure area is changed to the opposite direction from that of the panning operation (change in the imaging direction) with the same magnitude as the panning operation.

Panning operation is performed in instances that are roughly classified into the following first and second cases.

In the first case, the camera is unintentionally shaken, or the user intentionally adjusts the imaging direction slightly in preparation for the reappearance of the target. In the first case, the change in the view area is often relatively small.

In the second case, while the target is hidden, the user carries on the panning operation, predicting the movement of the target. For example, a situation where, during shooting of a running person with a telescopic lens, an obstacle such as a pedestrian comes in front of this running person, is imaginable. Another possible situation is where, during shooting of a flying airplane, an obstacle such as a tree comes in front of this airplane. In such situations, the movement of the target (running person or airplane) is readily predictable so that the user can continue the panning operation even though the target is obscured by the obstacle and not visible.

In the first case, it is desirable to correct the position of the tracking failure area in accordance with the amount of panning operation (amount of change in the imaging direction), as described with reference to FIG. 9. In the second case, correction in accordance with the amount of panning operation is not desirable, because the user is performing the panning operation in consideration of the framing (composition) and it is highly likely that the tracking failure area matches the position where the target ill reappear.

In the target resetting determination process of FIG. 10, it is determined whether or not the panning operation is continued from before the tracked target was lost, and the position of the tracking failure area is corrected if it is determined that the panning operation is continued from before the tracked target was lost. Alternatively, the position of the tracking failure area may be corrected in accordance with the amount of panning operation, irrespective of whether or not the panning operation is continued from before the tracked target was lost.

The processing steps S51 to S53 of FIG. 10 are the same as the processing steps S51 to S53 of FIG. 6.

According to the target resetting determination process of FIG. 10, the position of the tracking failure area is corrected suitably in accordance with the amount of panning operation, after which whether or not to execute the resetting of the target is controlled based on whether or not the line-of-sight position is within the tracking failure area. This way, even when a panning operation is carried out during the time in which the target is being waited for to reappear, target resetting is performed more favorably, based on accurate determination of whether or not the user is gazing at the tracking failure area.

Third Embodiment

Hereinafter, a third embodiment of the present invention will be described. In the third embodiment, the tracking failure area is extended to an area that includes an obstacle in the foreground to be able to handle the case in which the position where the target was obscured by the obstacle differs from the position where the target will reappear.

Figure 11A:
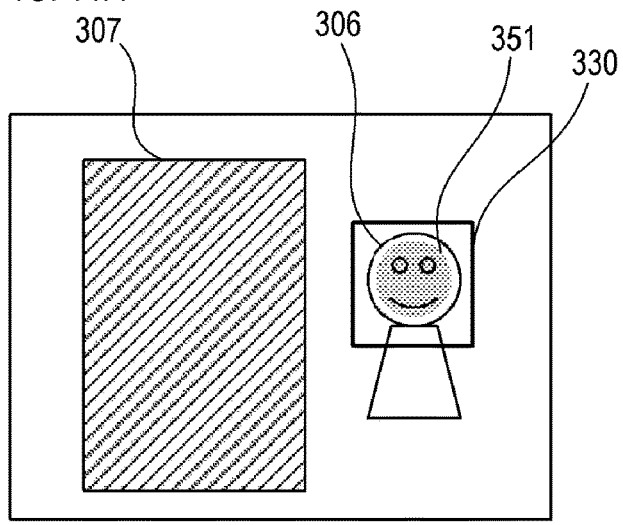
FIG. 11A to FIG. 11C are diagrams relating to target resetting determination according to a third embodiment.
Figure 11B:
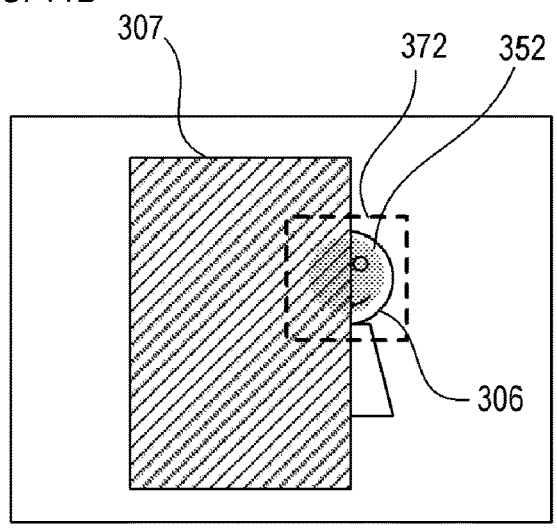
Figure 11C:
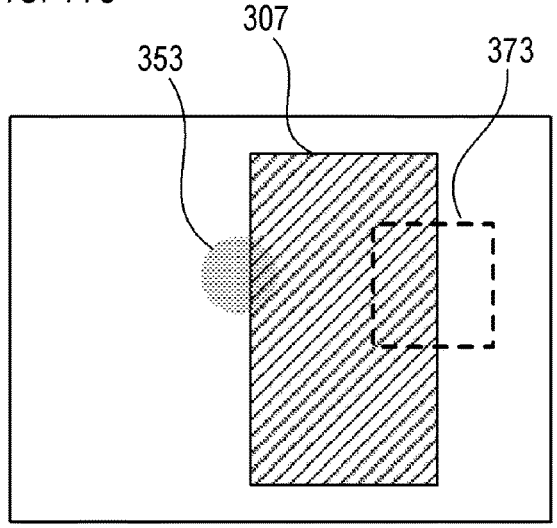

FIG. 1A to FIG. 11C illustrate an example of the case in which the position where the target was obscured by the obstacle differs from the position where the target will reappear. FIG. 11A to FIG. 11C illustrate the screens shown on the display unit 28. The screen changes as time passes from that of FIG. 11A to that of FIG. 11B, and from that of FIG. 11B to that of FIG. 11C. FIG. 1A to FIG. 11C illustrate a scene where a person 306 is obscured by an obstacle 307 (stationary). One example of such a scene would be a running person being hidden temporarily behind a pillar.

In FIG. 11A, the person 306 is set as the target, and a tracking frame 330 is displayed around the person 306. In FIG. 11A, the line-of-sight position 351 is matching the person 306. In FIG. 11B, the person 306 is hidden behind the obstacle 307. At this time, a tracking failure area 372, which is the area where the person 306 stopped being detected, is set and displayed. In FIG. 11B, the line-of-sight position 352 is matching the tracking failure area 372.

In FIG. 11C, the line-of-sight position 353 is not matching the tracking failure area 373. However, after a scene such as that illustrated in FIG. 11A to FIG. 11C, the line-of-sight position of the user who is waiting for the target to reappear moves around the obstacle because the user does not know which direction the target will reappear from relative to the obstacle (right or left). Therefore, in FIG. 11C, the line-of-sight position 353 is present around the tracking failure area 307. There are cases such as this where, even though the tracking failure area is not matching the line-of-sight position, the user is waiting for the target to reappear.

To deal with the situation described above, when a second object (non-target) such as an obstacle present in the foreground of the first object is detected in an area including at least part of the tracking failure area where the first object (target) was lost, the tracking failure area is extended to an area that includes the second object. The tracking failure area after the extension is the second object area or an area including the second object and its surroundings.

Figure 12:
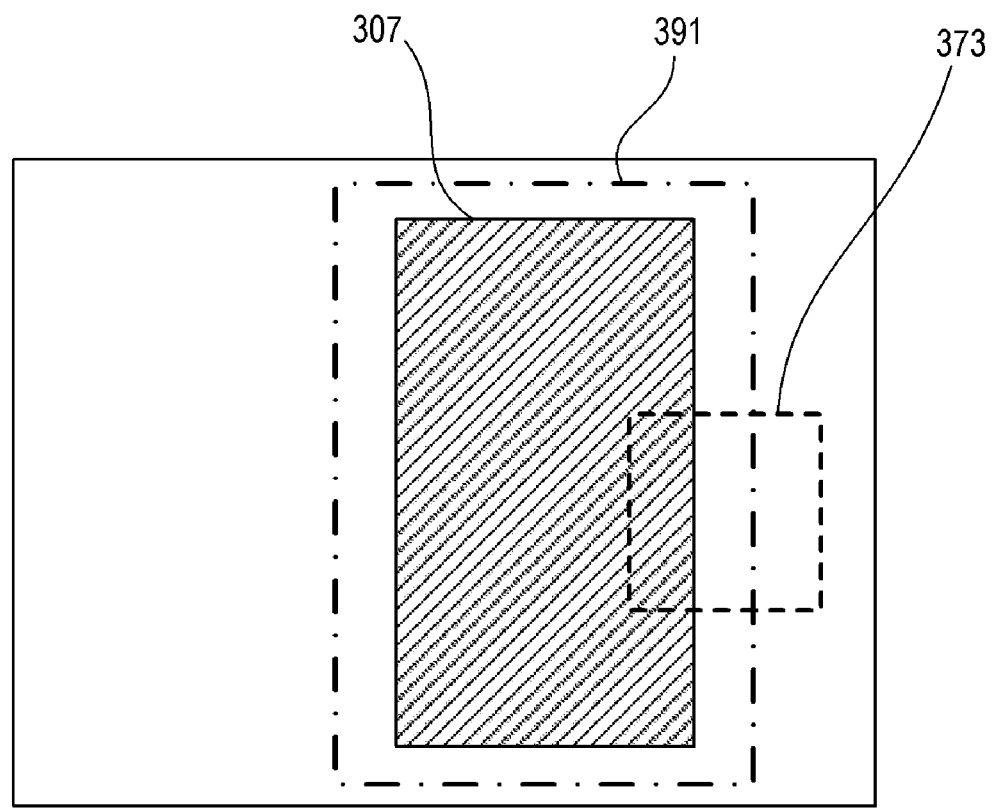
FIG. 12 is a diagram illustrating an example of tracking failure area extension according to the third embodiment.

FIG. 12 illustrates an example of extending the tracking failure area so as to include the second object. FIG. 12 illustrates the tracking failure area 373 before extension. There is an obstacle 307 near the tracking failure area 373 that is obscuring the target. The second object such as the obstacle 307 can be detected, for example, from an area in the foreground of the target, by creating a defocus map, and by referring to the amount of defocus of the target (first object) that was obtained before the target was lost. Specifically, an object located in an area including at least part of the tracking failure area before being extended and larger than the tracking failure area can be detected as the second object.

Alternatively, the image processing unit 24 may detect objects and locate the second object. At this time, an amount of defocus may also be obtained, to additionally carry out determination of credibility as to whether or not the detected object is the second object (obstacle obscuring the first object).

When the second object is detected, an extended tracking failure area is determined based on the detection result of the second object, and the tracking failure area is extended. In FIG. 12, an area 391 is determined as the extended tracking failure area, and the tracking failure area is extended from the area 373 to the area 391. The extended tracking failure area 391 is set larger than the obstacle 307. This is because it is highly likely that the user will look at the edges of the obstacle 307 during the period in which the user waits for the target to reappear. The width of the extended area may alternatively be determined based on the size of the obstacle (second object), detection accuracy of the line-of-sight detection unit 701, or the resolution of the defocus map used for the obstacle detection.

Figure 13:
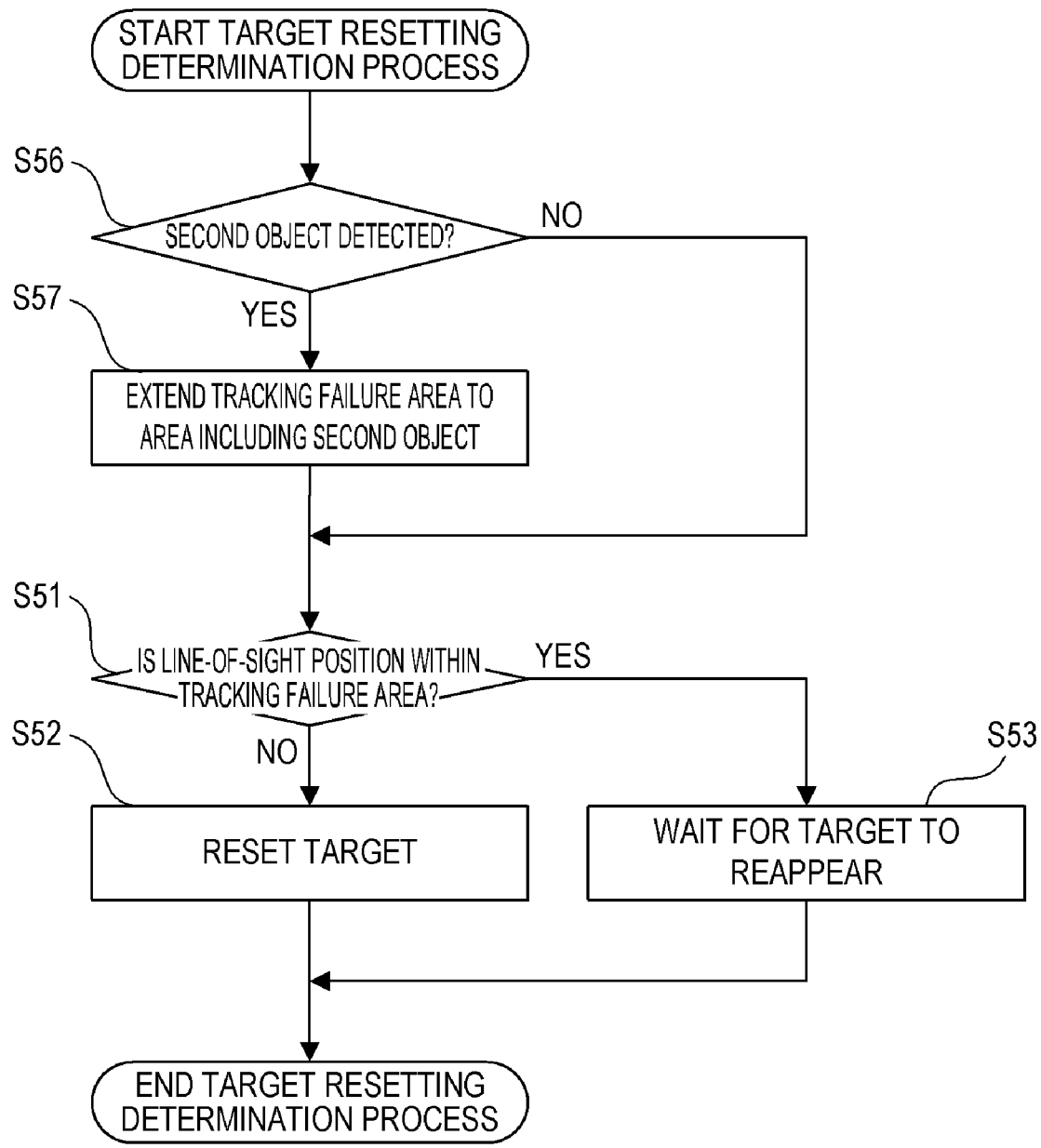
FIG. 13 is a flowchart illustrating an example of target resetting determination according to the third embodiment.

FIG. 13 is a flowchart of the target resetting determination process (step S5 of FIG. 5) according to the third embodiment. At step S56, the system control unit 50 detects a second object (obstacle obscuring the first object that is the target), and determines whether or not the second object has been detected. The system control unit 50 advances the process to step S57 if it determines that the second object has been detected, and advances the process to step S51 if it determines that the second object has not been detected. At step S57, the system control unit 50 extends the tracking failure area to an area that includes the second object, using the method described with reference to FIG. 12. The processing steps S51 to S53 of FIG. 13 are the same as the processing steps S51 to S53 of FIG. 6.

According to the target resetting determination process of FIG. 13, the tracking failure area is suitably extended to an area including the second object (obstacle obscuring the first object that is the target), after which whether or not to execute the resetting of the target is controlled based on whether or not the line-of-sight position is within the tracking failure area. This way, even when the position where the target was obscured by the obstacle differs from the position where the target will reappear, target resetting is performed more favorably, based on accurate determination of whether or not the user is waiting for the target to reappear.

Fourth Embodiment

Hereinafter, a fourth embodiment of the present invention will be described. The fourth embodiment allows for more accurate determination of whether or not the user is waiting for the target to reappear in cases where the target has moved out from an edge of the display surface of the display unit 28 (image display area).

The target may move out of the display surface during the shooting with a panning operation, for example. In such a case, the user already knows which of the plurality of edges (upper, lower, left, and right edges) of the display surface the target will reappear from. Accordingly, rather than using only the area where the target was lost as the tracking failure area, an area including one edge where the target went (moved) out among the plurality of edge parts of the display surface is used as the tracking failure area. This way, it is possible to determine more accurately whether or not the user wishes the target to reappear. The edge part of the display surface may be an area including the entire edge on the side where the target went out, or an area including a part of this edge (not including other parts), as long as it is an area wider than the area where the target was lost.

Figure 14A:
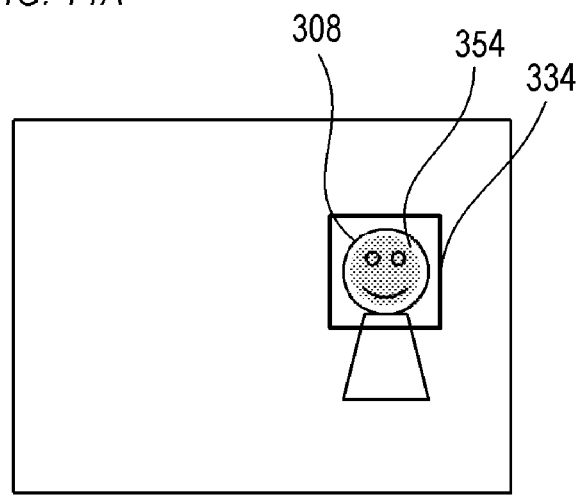
FIG. 14A and FIG. 14B are diagrams relating to target resetting determination according to a fourth embodiment.
Figure 14B:
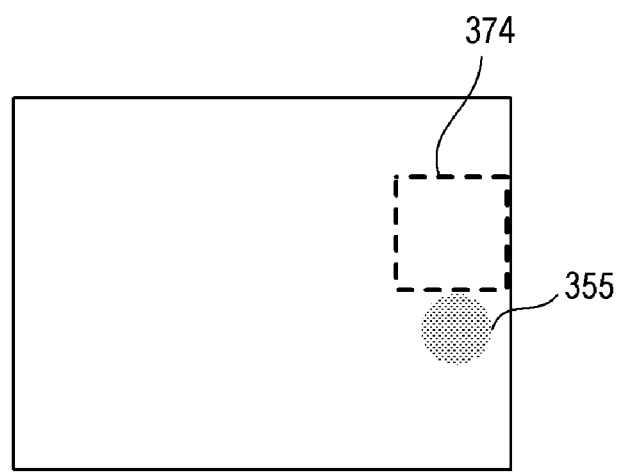

FIG. 14A and FIG. 14B illustrate an example of a case where the target has gone out from the right edge of the display surface. FIG. 14A and FIG. 14B illustrate the screens shown on the display unit 28. The screen changes as time passes from that of FIG. 14A to that of FIG. 14B.

In FIG. 14A, a person 308 is set as the target of object tracking, and a tracking frame 334 is displayed around the person 308. In FIG. 14A, the user's line-of-sight position 354 is matching the person 308.

In FIG. 14B, the person 308 that is the target has gone out from the right edge of the display surface. Accordingly, the tracking failure area 374 is displayed. In some cases the user may (while panning) wait for the target to reappear from the right edge of the display surface, but if the line-of-sight position is shifted out of the tracking failure area 374 as denoted at 355, the target may be reset. If the line-of-sight position stays at the edge part (edge part of the display surface) where the tracking failure area is present, it is highly likely that the user is waiting for the target to reappear.

Figure 15:
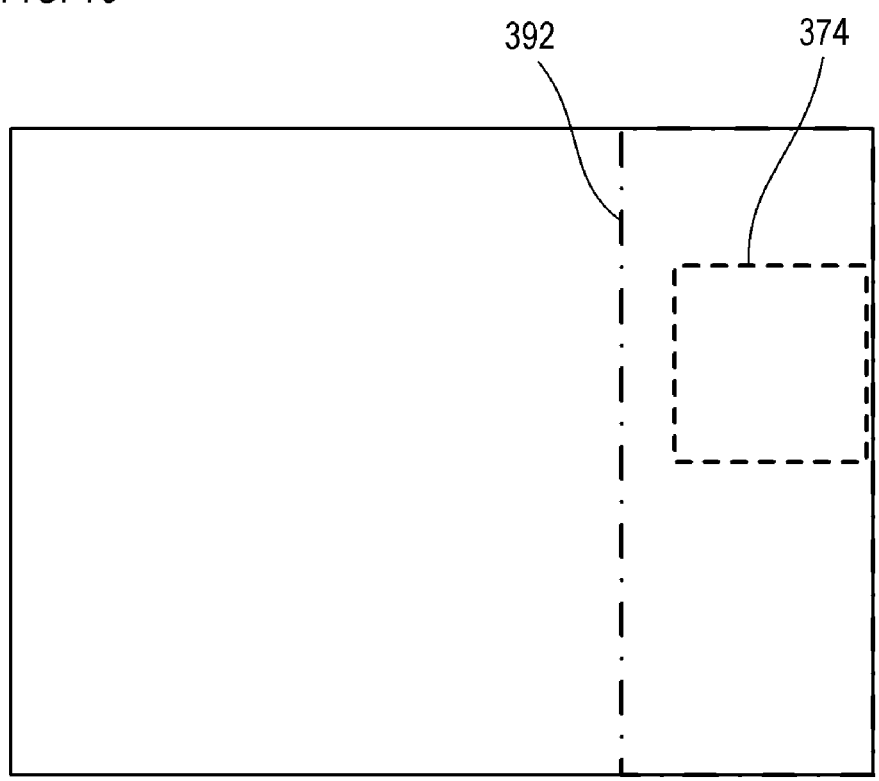
FIG. 15 is a diagram illustrating an example of tracking failure area extension according to the fourth embodiment.

Accordingly, in the fourth embodiment, when the tracking failure area is present in an edge part of the display surface, the tracking failure area is extended to include (cover) this edge part. FIG. 15 illustrates an example of extending the tracking failure area so as to include the edge part of the display surface. Since the tracking failure area 374 before the extension is present in a right edge part 392 of the display surface, the target is expected to reappear from the right edge of the display surface. Therefore, the tracking failure area is extended from the area 374 to the right edge part 392. The tracking failure area may be extended after setting the area where the target was lost as the tracking failure area, or, alternatively, an area including an edge part of the display surface may be set as the tracking failure area by default.

This way, it is possible to determine more accurately whether or not the user is waiting for the target to reappear in cases where the target has moved out from an edge of the display surface (image display area).

Figure 16:
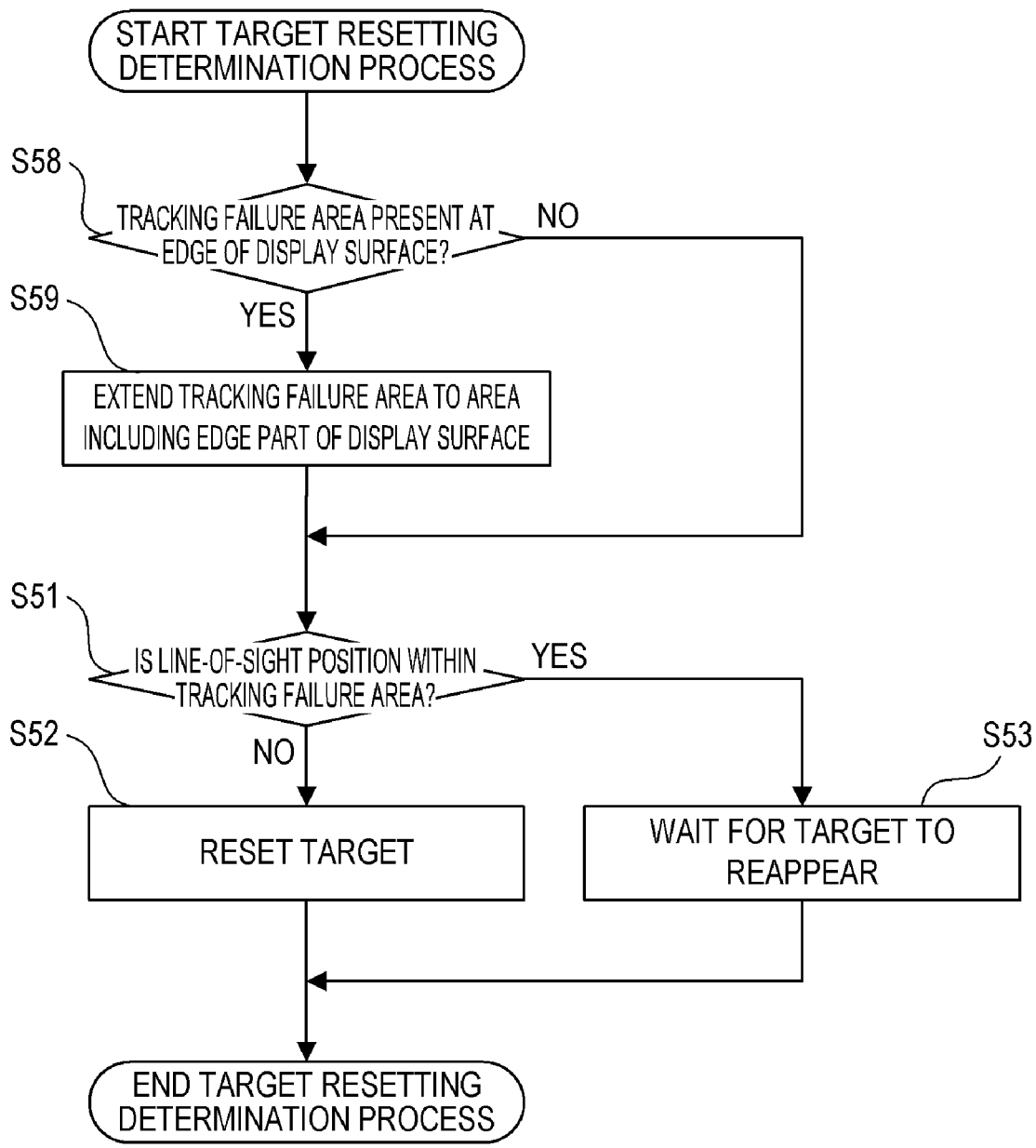
FIG. 16 is a flowchart illustrating an example of target resetting determination according to the fourth embodiment.

FIG. 16 is a flowchart of the target resetting determination process (step S5 of FIG. 5) according to the fourth embodiment. At step S58, the system control unit 50 determines whether or not the tracking failure area that is an area where the target has been lost is present at an edge of the display surface. The system control unit 50 advances the process to step S59 if it determines that the tracking failure area is present at an edge of the display surface, and advances the process to step S5 if it determines that the tracking failure area is not present at an edge of the display surface. At step S59, the system control unit 50 extends the tracking failure area to an area that includes an edge part of the display surface, using the method described with reference to FIG. 15. The processing steps S51 to S53 of FIG. 16 are the same as the processing steps S51 to S53 of FIG. 6.

According to the target resetting determination process of FIG. 16, the tracking failure area is suitably extended to an area including an edge part of the display surface (image display area), after which whether or not to execute the resetting of the target is controlled based on whether or not the line-of-sight position is within the tracking failure area. This way, it is possible to determine more accurately whether or not the user is waiting for the target to reappear in cases where the target has moved out from an edge of the display surface.

Fifth Embodiment

Hereinafter, a fifth embodiment of the present invention will be described. The fifth embodiment allows for more favorable resetting of the target when the target becomes undetectable even though the target is present within the captured image.

Object tracking (target detection), which is achieved using colors, characteristic points, motion vectors and the like, cannot be carried on with 100% certainty, whichever method is used. Therefore, sometimes the target may be determined undetectable even though the target is present within the captured image. In such a case, the target is assumed to have changed color or shape, and it is more desirable to reset the target, rather than wait for the target to reappear, for example by creating a template again to detect the object from an area close to the tracking failure area.

Accordingly, in the fifth embodiment, when the target is determined to be undetectable at step S3 of FIG. 5, the system control unit 50 determines whether or not there has been a large change in the amount of defocus of the tracking failure area before and after the tracked target was lost. The system control unit 50 performs the target resetting determination process at step S5 only when the amount of defocus has changed largely forward. If the amount of defocus has not changed largely forward, such as when the change in the amount of defocus before and after the tracked target was lost is smaller than a predetermined threshold, the system control unit 50 performs the process (resets the target) at step S52 of FIG. 6. In this case, a template may be created again to detect an object preferentially from an area close to the tracking failure area as described above, and the detected object may be reset as the target.

This way, object tracking can be carried on without the target being changed when the target becomes undetectable due to a change in the color or shape of the target even though the target is present within the captured image.

The present disclosure allows for more favorable resetting of a tracking target.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The embodiments described above are merely examples. Any configurations obtained by suitably modifying or changing some configurations of the embodiments within the scope of the subject matter of the present invention are also included in the present invention. The present invention also includes other configurations obtained by suitably combining the configurations of the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-019781, filed on Feb. 7, 2020, which is hereby incorporated by reference herein in its entirety.

What is claimed is:

1. An electronic device comprising at least one memory and at least one processor which function as:

an acquisition unit configured to acquire line-of-sight information relating to a line of sight of a user;
a display control unit configured to execute control to display a captured image on a display surface;
a tracking unit configured to detect an object in the image so as to track the object; and
a setting unit configured to set a tracking target of the tracking unit, wherein
the setting unit resets the tracking target based on the line-of-sight information and a tracking history of an object that is the tracking target in a case where the object stops being detected.

2. The electronic device according to claim 1, wherein,
in a case where the object that is the tracking target stops being detected, the setting unit
waits for the object to be detected again rather than resets the tracking target if a line of sight is directed toward a determination area based on a tracking history of the object in an image display area where the image is displayed, and
resets the tracking target rather than waits for the object to be detected again if a line of sight is shifted away from the determination area.

3. The electronic device according to claim 2, wherein the determination area includes an area where the object that is the tracking target stops being detected.

4. The electronic device according to claim 2, wherein the setting unit changes a position of the determination area in accordance with a change in an imaging direction of the image.

5. The electronic device according to claim 4, wherein the setting unit does not change a position of the determination area in accordance with a change in the imaging direction of the image if the imaging direction is changed continuously from before the object that is the tracking target stops being detected.

6. The electronic device according to claim 2, wherein,
in a case where an object that is not the tracking target is detected in an area including at least part of the determination area, the setting unit extends the determination area to an area including this object.

7. The electronic device according to claim 2, wherein,
in a case where the object that is the tracking target moves out of an image display area where the image is displayed and stops being detected, the setting unit uses an area including one edge on a side where the object moves out among a plurality of edge parts of the image display area as the determination area.

8. The electronic device according to claim 2, wherein,
in a case where a change in an amount of defocus of the determination area before and after a time when the object that is the tracking target stops being detected is smaller than a threshold, the setting unit resets the tracking target rather than waits for the object to be detected again even when a line of sight is directed toward the determination area.

9. The electronic device according to claim 2, wherein,
in a case where a period of time for which the object that is the tracking target is waited for to be detected again reaches a threshold, the setting unit stops waiting for the object to be detected again and resets the tracking target.

10. A control method of an electronic device, comprising:
acquiring line-of-sight information relating to a line of sight of a user;
executing control to display a captured image on a display surface;
detecting an object in the image so as to track the object; and
setting a tracking target, wherein
the tracking target is reset based on the line-of-sight information and a tracking history of an object that is the tracking target in a case where the object stops being detected.

11. A non-transitory computer readable medium that stores a program, wherein
the program causes a computer to execute a control method of an electronic device, comprising:
acquiring line-of-sight information relating to a line of sight of a user;
executing control to display a captured image on a display surface;
detecting an object in the image so as to track the object; and
setting a tracking target, and
the tracking target is reset based on the line-of-sight information and a tracking history of an object that is the tracking target in a case where the object stops being detected.

* * * * *